May 20, 1930.   C. A. OLSON   1,759,414
LAWN MOWER
Filed Feb. 18, 1928   2 Sheets-Sheet 1
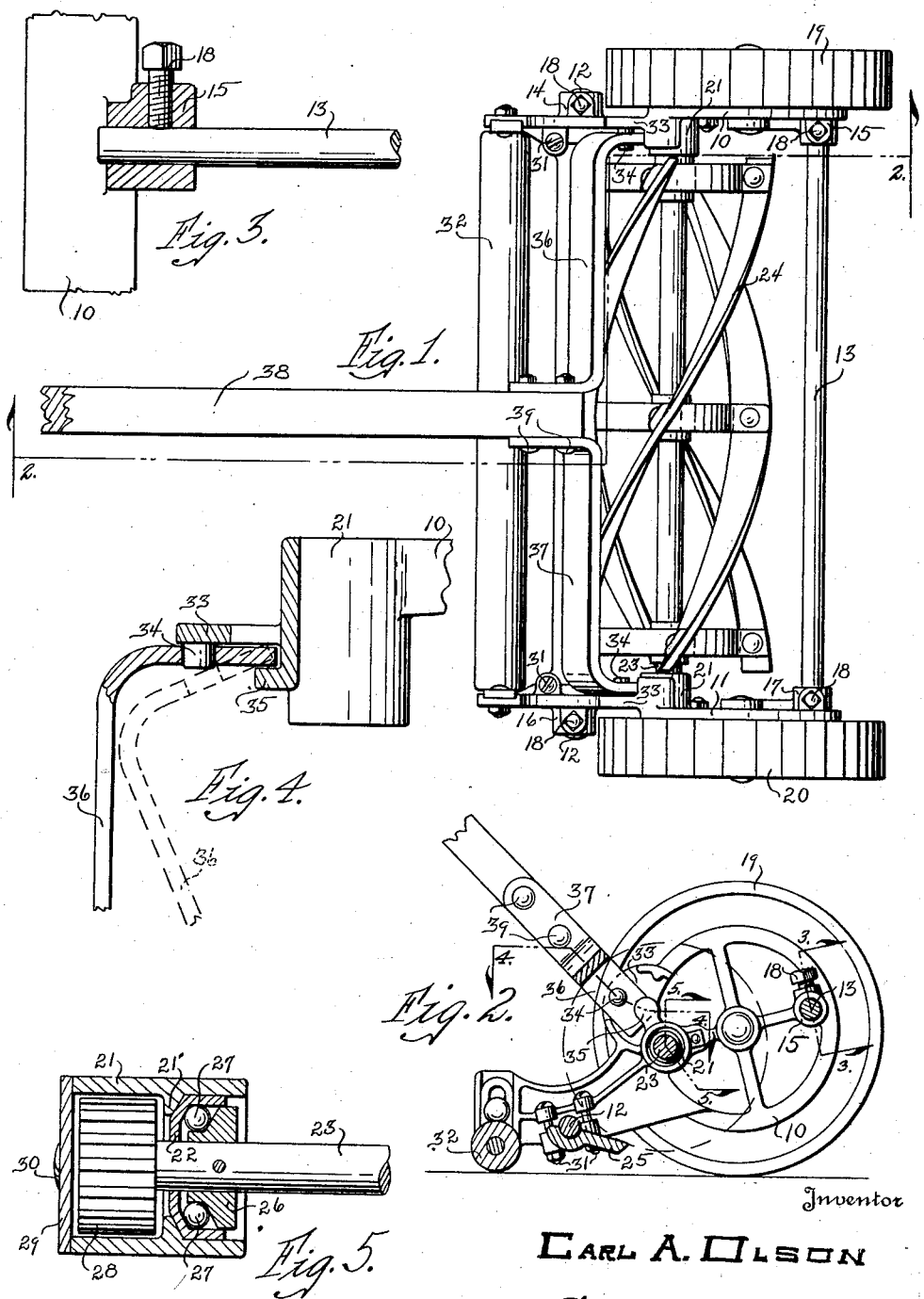
Inventor
CARL A. OLSON
By Earl M. Sinclair
Attorney

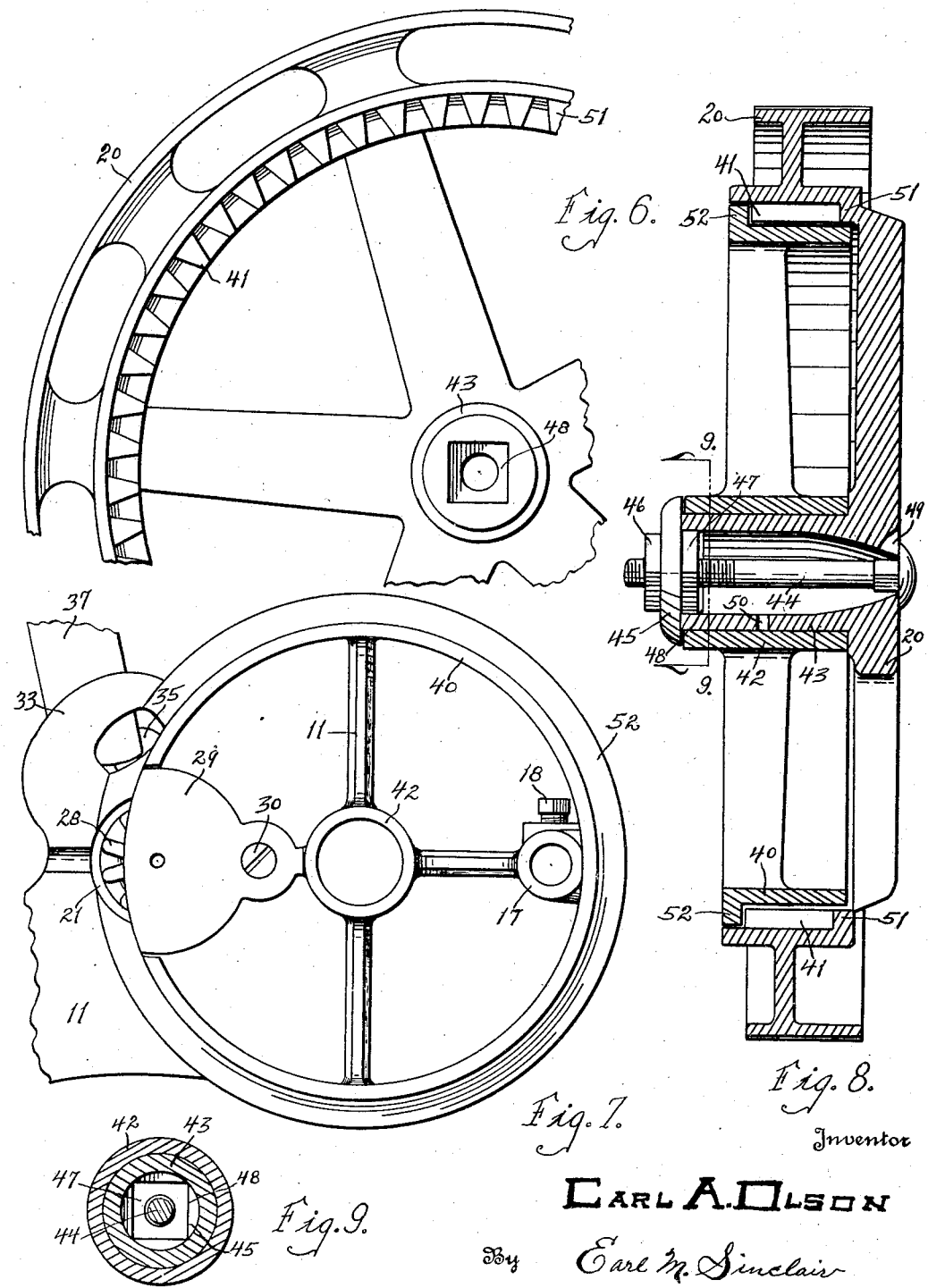

Patented May 20, 1930

1,759,414

UNITED STATES PATENT OFFICE

CARL A. OLSON, OF CLARINDA, IOWA, ASSIGNOR TO CLARINDA MANUFACTURING COMPANY, OF CLARINDA, IOWA, A CORPORATION OF IOWA

LAWN MOWER

Application filed February 18, 1928. Serial No. 255,301.

The principal object of this invention is to provide a lawn mower that is economical in manufacture and efficient in use.

A still further object is to provide a manually operated lawn mower having a handle so secured and positioned on its frame that the tendency of the mower to kick up is eliminated, or in other words, eliminating the tendency of the reel driving pinions from climbing the traction wheel gears when heavy or tall grass is encountered, as is the case with all hand mowers now on the market.

A still further object of this invention is to provide a lawn mower having reel bearings that may easily and quickly be adjusted when assembling the machine or to compensate for wear of the bearings by use.

A still further object of my invention is to provide a lawn mower that is easily assembled or dissembled with a minimum amount of tools.

A further object of the invention is to provide an improved construction for mounting of the traction wheels, which construction is economical and efficient in producing a satisfactory bearing for the wheels.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawings, in which:

Fig. 1 is a plan view of a lawn mower embodying my improvements, a portion of the handle being broken away to economize space.

Fig. 2 is an end sectional view of the same lawn mower taken on line 2—2 of Fig. 1 and more fully illustrates its construction.

Fig. 3 is a side sectional view taken on line 3—3 of Fig. 2 and illustrates the manner in which the space between the two side frames of the machine may be varied.

Fig. 4 is a plan sectional view taken on line 4—4 of Fig. 2 and illustrates the method of securing the handle fork to the machine.

Fig. 5 is a side sectional view taken on line 5—5 of Fig. 2 and illustrates more fully, the construction of the bearing member for the reel shaft.

Fig. 6 is an inner face view of a portion of one of the traction wheels.

Fig. 7 is an outer face view of a portion of one of the side frames with the traction wheel removed.

Fig. 8 is a diametrical section through one of the side frames and traction wheels and illustrating particularly the method of mounting the wheel on the frame.

Fig. 9 is a cross-section on the line 9—9 of Fig. 8.

The lawn mower constructed in accordance with my present invention embodies two parallel side frames or castings, which I have designated by the numerals 10 and 11. These side frames are rigidly held and adjustably spaced apart by the two rods 12 and 13, each having one of its ends entering a boss 14 or 15 respectively in the side frame 10 and its opposite end entering a boss 16 or 17 respectively in the side frame 11. Each of these rods is secured in its respective boss by a set screw 18, threaded into each boss, as shown in Fig. 1. By this construction, it will readily be noted that the distance between the two side frames may be varied by the loosening of the set screws 18 and the sliding of the two side members on the rods 12 and 13. Rotatably mounted at a point near the center of each of these side frames is a traction wheel, which wheels I have designated by the numerals 19 and 20. Integrally formed in each side frame, to the rear and slightly below the point where the traction wheels are rotatably mounted, is a bearing member 21. Loosely mounted in each bearing member is a ball embracing cup member 22 having its bottom sloping outwardly, as shown in Fig. 5, and engaging the inwardly extending peripheral flange 21' integrally formed on the inner wall of the bearing member 21. Passing through each of these cup members is the reel shaft 23, carrying the ordinary reel 24 which cooperates with the cutting knife 25 in the common and well known manner. Permanently secured on and near each end of the shaft 23 and extending into the adjacent cup member, is a ball bearing cone-shaped bearing member 26. The numeral 27 designates the ball bearings between each cup member 22 and cone bearing 26. To tighten the bearings when assembling the machine or adjusting the bearings to take up for natural wear by long usage, it is merely necessary to place the mower on end, bear down on the upper side frame and then tighten the set screws 18. This bearing adjustment will always be uniform, as the bottoms of the cup members 22 extend outwardly and the bearing members 26 are each cone-shaped and approximately parallel with the said bottoms. Secured to each end of the shaft 23 and in engagement with a traction wheel 19 or 20, is a pinion 28. The numeral 29 designates a cover plate partially inclosing the outer end of each of the bearing members 21 and held in place by the screw 30. The cutting knife 25 may be easily adjusted by the bolts 31.

To the rear of the cutting knife and rotatably mounted in the mower frame, is the usual wooden roller, which I have designated by the numeral 32. Integrally formed outside the natural radius of each of the side frames and at a point back of and slightly above the bearing member 21, is an ear 33 having an inwardly extending lug 34. The numeral 35 designates a small projection integrally formed on each of the side frames and parallel with the ear 33 on that side frame. The fork portion of the handle consists of two metal bars 36 and 37, each designed to embrace one of the lugs 34. Because of the projection 35, each of the members 36 and 37 when being placed in a normal position must be inserted at an angle as shown by the dotted lines in Fig. 4. Once the members 36 and 37 are in normal position, they may be secured to the ordinary handle 38 by the bolts 39. To remove the handle assembly from the lawn mower, it is necessary to first remove the bolts 39. By this arrangement of securing and positioning the handle assembly to the machine, the handle cannot only be easily disassembled for packing, shipment or storage, but the force when operating the machine will be so directed that there will be no tendency for the pinions 28 to climb the traction wheel gears and kick the machine up from the rear, as is now experienced by lawn mower operators.

In Figs. 6 to 9 inclusive, I have shown particularly the method of mounting the traction wheels on the side frames to produce an easily assembled, long lived, and efficient bearing means for the wheels. Each of the side frames such as 11, is formed with an annular flange or rim 40 projecting laterally from its outer face. The rim 40 is cut away at its rear side to provide space for the bearing member 21 and to permit the pinion 28 to project into contact with the internal gear 41 of the adjacent traction wheel such as 20, whereby the reel shaft 23 is driven as the mower is advanced, in a common manner. Formed on each of the side frames such as 11 and concentrically of its rim 40, is a bearing member 42, which is open at both ends. At the axis of each traction wheel such as, 20 is integrally formed a tubular axle member 43 which projects laterally and is adapted to be received within a bearing member 42 for rotary movement relative thereto. The axle member 43 projects slightly beyond the inner end of the bearing member 42. An axle bolt 44 is mounted through the tubular axle member 43 with its head against the outer face of the traction wheel and with its threaded end projecting beyond the inner end of said axle member. Mounted on the threaded end of the bolt 44 is a cap washer 45 which contacts with and closes the inner end of the tubular axle member 43 and is slightly spaced from the inner end of the bearing member 42. A nut 46 is mounted on the threaded end of the bolt 44 and serves to hold the parts in assembled relation. The cap washer 45 is formed on its inner face with a polygonal boss 47 which fits within a polygonal recess 48 of the inner end of the tubular axle 43. This serves to center the cap washer 45 and it in turn centers the axle bolt 44. It is evident that I have provided a simple and economical method of mounting the traction wheels on the side frames of the mower and a method by which ample and efficient bearing is provided for each of the wheels to cause said wheels to run smooth and true; also a bearing which will remain efficient and satisfactory over a long period of use.

To provide means for lubricating the traction wheels, a groove 49 is cast at the edge of the hole, through which the axle bolt 44 extends. The groove 49 extends beyond the head of the bolt 44 and provides an oil hole leading from the outer face of the wheel, such as 20, (Fig. 8) to the interior of the hollow axle member 43. A hole 50 is also formed transversely through the wall of the axle member 43 to permit lubricant to pass from the interior of said member and to lubricate the contact of said member with the interior of the bearing member 42. The chamber formed by the hollow axle member 43 constitutes an oil chamber which may be packed with lubricant or may be supplied with oil through the groove 49 from time to time and which has sufficient capacity to provide adequate lubrication for the bearing of the wheel. By casting the groove 49 at the edge of the bolt hole in the wheel, the operation of drilling a separate oil hole is dispensed with.

It will also be noticed from Fig. 8 that the wheel 20 is formed with a peripheral flange 51 extending around the outer ends of the teeth of the internal gear 41 and that the rim 40 of the frame member projects past said flange 51; also that the rim 40 is formed at its inner margin with a peripheral flange 52 projecting toward the rim of the wheel and past the inner ends of the teeth of said internal gear. This structure provides a substantial inclosure for the internal gear, which prevents the access of dirt and other foreign substances thereto.

Some changes may be made in the construction and arrangement of my improved lawn mower without departing from the real spirit and purpose of my invention and it is my intention to cover by my claims any modified forms of structure or use of mechanical equivalents which may be reasonably included within their scope.

I claim:

1. In a lawn mower, a pair of side frames, a means for holding said side frames spaced apart and parallel with each other, a reel shaft journaled in said frames, each of said frames being formed with a substantially annular flange, a wheel mounted adjacent each side frame and formed with an internal gear embracing its flange, pinions on said reel shaft meshing with the internal gears of said wheels, and a handle member secured to said frames, the points of connection of said handle member to the frames being located outside of the annular flanges thereof and above said reel shaft, whereby force applied to the handle will exert a downward pressure on the rear portions of the side frames to reduce the tendency of said pinions to travel upwardly on said internal gears.

2. In a lawn mower, a pair of side frames having their main portions circular in outline, a means for rigidly holding said side frames in spaced parallel relation one with the other, a traction wheel rotatably mounted on and concentrically of each of said side frames, a reel shaft rotatably mounted in said side frames and operatively connected with said traction wheels, a reel on said shaft, an ear integrally formed on each of said side frames and projecting outside of and beyond the circumference thereof and rearwardly of the axis of rotation of said wheels, a lug formed on each of said ears, and a handle member pivotally mounted on said lugs rearwardly and outside of the circumference of said circular side frames, whereby the tendency of the frames to tip forwardly when pressure is applied to the handle member is reduced.

3. In a lawn mower, a side frame formed with a bearing open at both ends, a traction wheel having a part engaging one end of said bearing and formed with a tubular axle member rotatably received within said bearing, a cap washer mounted against the free end of said tubular axle member and adapted to engage the adjacent end of the bearing, and an axle bolt extending through said tubular axle member and through said cap washer and serving to hold the parts in assembled relation.

4. In a lawn mower, a side frame formed with a bearing, a traction wheel formed with a tubular axle member rotatably received within said bearing, a cap washer mounted at the free end of said tubular axle member, and an axle bolt extending through said tubular axle member and through said cap washer and serving to hold the parts in assembled relation, said cap washer being formed on its inner face with a polygonal boss fitting within a polygonal recess in the end of said axle member 5. In a lawn mower, a side frame formed with a bearing, a traction wheel having a part engaging one end of said bearing and formed with a tubular axle member serving as a reservoir for lubricant and rotatably received within said bearing, a cap washer mounted against the free end of said axle member, and an axle bolt extending through said tubular axle member and through said cap washer for holding the parts together, means permitting the introduction of lubricant to the interior of said tubular axle member, and a port through said axle member for the passage of lubricant from the interior to the exterior thereof to lubricate its bearing as the wheel rotates.

6. In lawn mower, a frame member, a pivot stud projecting laterally therefrom, a handle iron formed with an aperture to receive said stud, and a projection spaced from the base portion of the frame member a distance corresponding substantially with the length of the stud to prevent direct lateral movement of the handle iron into and out of engagement with the stud.

7. In a lawn mower, a side frame, an ear projecting therefrom, a pivot stud projecting laterally from said ear, a handle iron formed with an aperture to receive said stud, and a projection on the side frame parallel with said ear and spaced therefrom a distance corresponding substantially with the length of said stud, the outer end of said projection being spaced from the stud to permit the handle iron to be moved into and out of pivotal engagement with the stud by a substantially arcuate movement, and whereby the projection prevents removal of the handle iron from the stud by bodily movement in a direction substantially parallel to the axis of the stud.

CARL A. OLSON.